Patented Feb. 17, 1931

1,793,173

UNITED STATES PATENT OFFICE

ERWIN HOFFA AND WILHELM LUCE, OF HOCHST-ON-THE-MAIN, GERMANY, ASSIGNORS TO GENERAL ANILINE WORKS, INC., OF NEW YORK, N. Y., A CORPORATION OF DELAWARE

PROCESS OF PREPARING INDIGOID VAT DYESTUFFS

No Drawing. Application filed January 26, 1928, Serial No. 249,765, and in Germany January 27, 1927.

The present invention relates to a new process of preparing vat-dyestuffs.

When arylthioglycollic acids are acted upon with phosphorus pentoxide a condensation will first take place with formation of hydroxythionaphthenes. It is, however, difficult to obtain in the said manner hydroxythionaphthenes with a technically satisfactory yield because by the action of phosphorus pentoxide or a phosphoric acid upon hydroxythionaphthenes further condensations are caused.

We have now found that vat dyestuffs are obtained by treating with phosphorus pentoxide, a mixture of an arylthioglycollic acid and an ortho-diketone capable of being coupled and having the following general formula:

wherein X stands for

belonging to an aromatic ring and wherein the atoms $C_{(1)}$ and $C_{(2)}$ are members of an aromatic ring for instance isatin, acenaphthenequinone or the like or substitution products, homologues or analogues thereof. Owing to the fact that there occurs immediately a condensation with the said diketones etc., the hydroxythionaphthenes which are formed as intermediate products are prevented from being further acted upon by the condensing agent.

It is advantageous to add to the phosphorus pentoxide a dispersing agent which keeps the condensing agent from sticking together, or the operations may be carried out in a solvent, which renders the phosphoric acid produced innocuous.

The following examples serve to illustrate the invention, but they are not intended to limit it thereto, the parts being parts by weight:

(1) A mixture of 252,5 parts of 1-chlornaphthalene-2-thioglycollic acid with 147 parts of isatin is dissolved in 3000 parts of dichlorobenzene while heating. To the hot solution is added a mixture of 300 parts of phosphorus pentoxide with 300 parts of silicic anhydride. The resulting mixture is kept boiling for half an hour whereupon the dyestuff which has formed is allowed to cool and then filtered by suction; it can be freed from the admixed silicic acid by treating it with a caustic soda solution. The dyestuff dyes the fiber from the vat claret-red tints. It has probably the following formula:

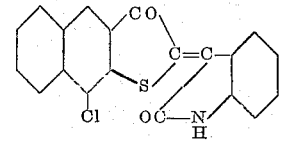

(2) 218 parts of β-naphthylthioglycollic acid and 305 parts of 5.7-dibromisatin are dissolved in 5000 parts of chlorobenzene. To the boiling solution is added an intimate mixture of 300 parts of phosphorus pentoxide and 300 parts of silicic anhydride. The mass is then boiled for 2 hours in a reflux apparatus, while stirring, and the resulting dyestuff, after cooling, is filtered by suction. It may be purified as indicated in Example 1, and dyes the fiber from the vat brown tints. The dyestuff has probably the following formula:

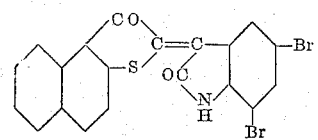

(3) 216,5 parts of 6-methyl-4-chlorphenyl-1-thioglycollic acid and 182 parts of acenaphthenquinone are dissolved while heating, in 5000 parts of chlorobenzene. After having added to the solution a mixture of 300 parts of phosphorus pentoxide and 300 parts of silicic anhydride the whole is boiled until the formation of the dyestuff is complete. After cooling, the resulting red vat-dyestuff is filtered by suction and purified in the manner indicated in Example 1. Instead of the free thioglycollic acid, there may also be used the corresponding quantity of its salts. The dyestuff obtained according to this example has probably the following formula:

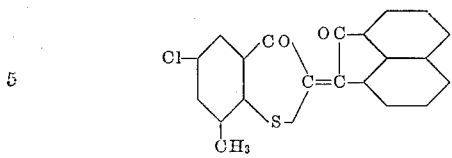

We claim:

1. The process which comprises subjecting an arylthioglycollic acid having an unsubstituted ring carbon ortho to said acid group mixed with a condensable o-diketone of the general formula:

wherein X stands for $$\overset{H}{\underset{|}{S, N}} \text{ or a C-atom}$$

belonging to an aromatic ring and wherein the atoms $C_{(1)}$ and $C_{(2)}$ are members of an aromatic ring to the action of phosphorus pentoxide in the presence of an indifferent organic diluent.

2. The process which comprises subjecting an arylthioglycollic acid having an unsubstituted ring carbon ortho to said acid group mixed with a condensable o-diketone of the general formula:

wherein the atoms $C_{(1)}$ and $C_{(2)}$ are members of an aromatic ring to the action of phosphorus pentoxide in the presence of an indifferent organic diluent.

3. The process which comprises subjecting an arylthioglycollic acid having an unsubstituted ring carbon ortho to said acid group mixed with 5.7-dibromisatin to the action of phosphorus pentoxide in the presence of an indifferent organic diluent.

4. The process which comprises subjecting naphthalene-β-thioglycollic acid mixed with a condensable o-diketone of the general formula:

wherein X stands for $$\overset{H}{\underset{|}{S, N}} \text{ or a C-atom}$$

belonging to an aromatic ring and wherein the atoms $C_{(1)}$ and $C_{(2)}$ are members of an aromatic ring to the action of phosphorus pentoxide in the presence of an indifferent organic diluent.

5. The process which comprises subjecting naphthalene-β-thioglycollic acid mixed with a condensable o-diketone of the general formula:

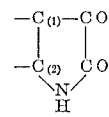

wherein the atoms $C_{(1)}$ and $C_{(2)}$ are members of an aromatic ring to the action of phosphorus pentoxide in the presence of an indifferent organic diluent.

6. The process which comprises subjecting naphthalene-β-thioglycollic acid mixed with 5.7-dibromisatin to the action of phosphorus pentoxide in the presence of chlorobenzene.

In testimony whereof, we affix our signatures.

ERWIN HOFFA.
WILHELM LUCE.